US010700795B2

(12) United States Patent
Li et al.

(10) Patent No.: US 10,700,795 B2
(45) Date of Patent: Jun. 30, 2020

(54) MEASUREMENT METHOD, TERMINAL, DEVICE, AND ACCESS NETWORK DEVICE

(71) Applicant: Huawei Technologies Co., Ltd., Shenzhen (CN)

(72) Inventors: Bingzhao Li, Beijing (CN); Wei Quan, Beijing (CN); Zhenzhen Cao, Beijing (CN); Xuelong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/554,269

(22) Filed: Aug. 28, 2019

(65) Prior Publication Data
US 2019/0386757 A1    Dec. 19, 2019

Related U.S. Application Data

(63) Continuation of application No. PCT/CN2018/085699, filed on May 4, 2018.

(30) Foreign Application Priority Data

May 5, 2017   (CN) .......................... 2017 1 0314136

(51) Int. Cl.
*H04B 17/00*    (2015.01)
*H04L 23/00*    (2006.01)
(Continued)

(52) U.S. Cl.
CPC ......... *H04B 17/309* (2015.01); *H04B 7/0626* (2013.01); *H04B 7/0632* (2013.01);
(Continued)

(58) Field of Classification Search
CPC .. H04B 17/309; H04B 7/0626; H04B 7/0632; H04B 7/0857; H04B 7/088;
(Continued)

(56) References Cited

U.S. PATENT DOCUMENTS

2014/0004897 A1*  1/2014  Jung ................... H04W 72/082
                                                      455/509
2015/0010112 A1*  1/2015  Liu ....................... H04W 24/08
                                                      375/316
(Continued)

FOREIGN PATENT DOCUMENTS

CN    105992265 A    10/2016
CN    106165323 A    11/2016
CN    106576265 A     4/2017

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.2.2, Apr. 2017, 721 pages.
(Continued)

*Primary Examiner* — Tesfaldet Bocure
(74) *Attorney, Agent, or Firm* — Slater Matsil, LLP

(57) ABSTRACT

This application provides a measurement method, a terminal device, and an access network device. The measurement method includes: measuring, by a terminal device, signal quality of a plurality of beams, where the signal quality of the plurality of beams is obtained by using synchronization signal blocks; the signal quality of the plurality of beams includes signal quality of a same beam at different moments, and the plurality of beams belong to one cell; and obtaining, by the terminal device, signal quality of the cell based on the signal quality of the plurality of beams. In this way, cell measurement based on a synchronization signal is implemented, and the signal quality of the cell obtained based on the signal quality of the plurality of beams at the different moments is more accurate.

14 Claims, 7 Drawing Sheets

(51) Int. Cl.
*H04B 17/309* (2015.01)
*H04B 7/06* (2006.01)
*H04B 7/08* (2006.01)
*H04L 5/00* (2006.01)
*H04L 27/26* (2006.01)
*H04W 24/10* (2009.01)

(52) U.S. Cl.
CPC ............ *H04B 7/088* (2013.01); *H04B 7/0857* (2013.01); *H04L 5/0048* (2013.01); *H04L 27/2657* (2013.01); *H04W 24/10* (2013.01)

(58) Field of Classification Search
CPC . H04B 7/0695; H04L 5/0048; H04L 27/2657; H04W 24/1018; H04W 74/0833; H04W 24/00; H04W 24/10
USPC ........................................ 375/224, 259, 377
See application file for complete search history.

(56) References Cited

U.S. PATENT DOCUMENTS

| | | | |
|---|---|---|---|
| 2016/0190707 A1* | 6/2016 | Park | H01Q 1/246 370/334 |
| 2017/0223667 A1 | 8/2017 | Yi et al. | |
| 2017/0373772 A1 | 12/2017 | Gao et al. | |
| 2018/0323850 A1* | 11/2018 | Baligh | H04B 7/043 |
| 2019/0074877 A1 | 3/2019 | Nigam et al. | |
| 2019/0082346 A1* | 3/2019 | Tang | H04W 24/02 |
| 2019/0082363 A1* | 3/2019 | Park | H04W 80/02 |
| 2019/0132066 A1* | 5/2019 | Park | H04W 36/0094 |
| 2019/0150020 A1* | 5/2019 | Takahashi | H04B 17/309 455/115.1 |
| 2019/0223117 A1* | 7/2019 | Chai | H04W 52/367 |
| 2019/0230544 A1* | 7/2019 | Zhu | H04W 24/10 |
| 2019/0230550 A1* | 7/2019 | Yiu | H04W 24/10 |
| 2019/0253949 A1* | 8/2019 | Park | H04B 7/0695 |
| 2019/0393980 A1* | 12/2019 | Lin | H04W 24/10 |
| 2020/0008092 A1* | 1/2020 | Geng | H04L 5/0057 |
| 2020/0059395 A1* | 2/2020 | Chen | H04L 41/0631 |

OTHER PUBLICATIONS

3rd Generation Partnership Project; Technical Specification Group Radio Access Network; Evolved Universal Terrestrial Radio Access Network (E-UTRAN); S1 Application Protocol (S1AP) (Release 14), 3GPP TS 36.413 v14.2.0, Mar. 2017, 342 pages.

3rd Generation Partnership Project; Technical Specification Group Radio Access Network; Evolved Universal Terrestrial Radio Access (E-UTRA) and NR; Multi-connectivity; Stage 2 (Release 15), 3GPP TS 37.340, v0.1.0, May 2017, 13 pages.

3rd Generation Partnership Project; Technical Specification Group Radio Access Network; NR; Radio Resource Control (RRC); Protocol specification (Release 15), 3GPP TS 38.331 v0.0.2, Mar. 2017, 13 pages.

Samsung, "Discussion on Beam Measurement for 5G New Radio Interface in mmWave Frequency Bands," 3GPP TSG RAN WG2 #94, R2-163652, Nanjing, China, May 23-27, 2016, 4 pages.

Huawei, et al., Measurement configuration and procedures for CSI-RS 3GPP TSG-RAN WG2 #99bis, R2-1710544, Prague, Czech Republic, Oct. 9-13, 2017, 5 pages.

Mediatek Inc., RRM Measurement in Connected based on NR-SS and CSI-RS, 3GPP TSG-RAN WG2 Meeting 97bis, R2-1702771, Spokane, USA, Apr. 3-7, 2017, 4 pages.

Samsung, Cell measurement with NR-SS and CSI-RS 3GPP TSG-RAN WG2 2017 RAN2#97bis Meeting, R2-1703724, Spokane, USA, Apr. 3-7, 2017, 5 pages.

Samsung, RRM Measurement in NR:The Details of Cell Quality Derivation, 3GPP TSG RAN WG2 #97bis, R2-1703722, Spokane, USA, Apr. 3-7, 2017, 5 pages.

Samsung, RRM Measurement in NR:The Details of Filtering 3GPP TSG RAN WG2 #97bis, R2-1703721, Spokane, USA, Apr. 3-7, 2017, 6 pages.

* cited by examiner

MEASUREMENT METHOD, TERMINAL, DEVICE, AND ACCESS NETWORK DEVICE

CROSS-REFERENCE TO RELATED APPLICATIONS

This application is a continuation of International Application No. PCT/CN2018/085699, filed on May 4, 2018, which claims priority to Chinese Patent Application No. 201710314136.3, filed on May 5, 2017, The disclosures of the aforementioned applications are hereby incorporated by reference herein in their entireties.

TECHNICAL FIELD

This application relates to communications technologies, and in particular, to a measurement method, a terminal device, and an access network device.

BACKGROUND

In a Long Term Evolution (Long Term Evolution, LTE for short) system, a terminal device performs radio resource management (Radio Resource Management, RRM for short) measurement based on a reference signal (Reference Signal, RS for short). If quality of a serving cell of the terminal device reaches a threshold, the terminal device stops measuring an intra-frequency neighboring cell to save power. If quality of a serving cell is lower than a threshold, the terminal device starts measuring an intra-frequency neighboring cell, to find a better intra-frequency neighboring cell. However, in the prior art, when calculating cell quality, a terminal device detects beams of a cell based on a quantity N of beams that need to be measured and that are specified by a network side, and detects a quantity M of beams whose signal quality exceeds a threshold. If M is greater than N, quality of N beams with best quality is averaged to obtain the cell quality. If M is less than N, quality of the M beams is averaged to obtain the cell quality. Cell quality obtained by averaging beam quality is inaccurate.

In a 5th generation mobile communications (5th-Generation, 5G for short) system, a terminal device does not perform RRM measurement based on an RS any more, but performs RRM measurement based on a synchronization signal (Synchronization Signal, SS for short). However, in the prior art, there is no specific implementation of measurement based on a synchronization signal.

SUMMARY

This application provides a measurement method, a terminal device, and an access network device, so as to make measurement of cell signal quality more accurate.

A first aspect of this application provides a measurement method, including: measuring, by a terminal device, signal quality of a plurality of beams, where the signal quality of the plurality of beams is obtained by using synchronization signal blocks, the signal quality of the plurality of beams includes signal quality of a same beam at different moments, and the plurality of beams belong to one cell; and obtaining signal quality of the cell based on the signal quality of the plurality of beams. In this way, cell measurement based on a synchronization signal is implemented, and the signal quality of the cell obtained based on the signal quality of the plurality of beams at the different moments is more accurate.

In a possible implementation, at least one piece of signal quality of one beam in the signal quality of the plurality of beams is obtained by using a synchronization signal block of the beam.

In a possible implementation, the obtaining, by the terminal device, signal quality of the cell based on the signal quality of the plurality of beams is specifically: separately performing, by the terminal device, filtering processing on the signal quality of the plurality of beams; and obtaining the signal quality of the cell based on filtered signal quality of the plurality of beams.

In a possible implementation, the method further includes: measuring, by the terminal device, only some beams of the cell when the signal quality of the cell exceeds a second quality threshold. In other words, remaining beams are no longer measured. Because only some beams of the cell are measured, power consumption of the terminal device is reduced.

In this specification, "exceed" means "greater than" or "greater than or equal to".

In a possible implementation, the method further includes: obtaining, by the terminal device, a synchronization signal burst set sending period of the cell, where the synchronization signal burst set sending period includes one or more synchronization signal bursts, and there is a time interval between adjacent synchronization signal bursts. Usually, there is a time interval between adjacent synchronization signal bursts in the synchronization signal burst set sending period, each synchronization signal burst may include a plurality of synchronization signal blocks, and each synchronization signal block is sent on one beam. The synchronization signal burst set sending period may also be referred to as a synchronous signal burst set periodicity. Correspondingly, the measuring, by a terminal device, signal quality of a plurality of beams is specifically: detecting, by the terminal device within at least two synchronization signal burst set sending periods, synchronization signal blocks that are sent by an access network device on the plurality of beams, to obtain the signal quality of the plurality of beams; and determining that beam signal quality detected on synchronization signal blocks at a same corresponding position in the at least two synchronization signal burst set sending periods belongs to a same beam.

In a possible implementation, the method further includes: obtaining, by the terminal device, synchronization signal burst configuration information, where if the synchronization signal burst configuration information includes a quantity of synchronization signal bursts included in the synchronization signal burst set sending period, and a length and a starting position of a synchronization signal burst, the detecting, by the terminal device within at least two synchronization signal burst set sending periods, synchronization signal blocks that are sent by an access network device on the beams, to obtain the signal quality of the plurality of beams is specifically: detecting, by the terminal device in synchronization signal bursts of the at least two synchronization signal burst set sending periods based on the synchronization signal burst configuration information, the synchronization signal blocks that are sent by the access network device on the plurality of beams, to obtain the signal quality of the beams.

In a possible implementation, the method further includes: obtaining, by the terminal device, a synchronization signal burst set sending period of the cell, where the synchronization signal burst set sending period includes one or more synchronization signal bursts. There is a time interval between adjacent synchronization signal bursts, each synchronization signal burst includes one or more synchronization signal blocks, and each synchronization signal block is sent on one beam. Correspondingly, the measuring, by a terminal device, signal quality of a plurality of beams is specifically: detecting, by the terminal device within the synchronization signal burst set sending period, synchronization signal blocks that are sent by an access network device on the plurality of beams, to obtain the signal quality of the plurality of beams; determining, based on a beam timing index included in each received synchronization signal block, an identifier of a beam on which each synchronization signal block is sent; and determining that signal quality of beams having a same identifier belongs to a same beam.

In a possible implementation, the determining, by the terminal device based on a beam timing index included in each received synchronization signal block, an identifier of a beam on which each synchronization signal block is sent is specifically: performing, by the terminal device, a modulo operation on the beam timing index included in each synchronization signal block and the synchronization signal burst set sending period, to obtain the identifier of the beam on which each synchronization signal block is sent; or determining, by the terminal device, that the beam timing index included in each synchronization signal block is the identifier of the beam on which each synchronization signal block is sent.

In a possible implementation, the method further includes: measuring, by the terminal device, a neighboring cell of the cell, to obtain signal quality of the neighboring cell; determining an identifier of a to-be-reported beam from a plurality of beams of the neighboring cell, and/or determining an identifier of a to-be-reported beam from the plurality of beams of the cell; and sending the signal quality of the neighboring cell, the signal quality of the cell, and the identifier of the to-be-reported beam of the cell and/or the identifier of the to-be-reported beam of the neighboring cell to an access network device. In this way, the access network device performs neighboring cell handover based on the identifier of the to-be-reported beam, thereby increasing a success rate of neighboring cell handover.

In a possible implementation, the determining, by the terminal device, an identifier of a to-be-reported beam from beams of the neighboring cell, and/or determining an identifier of a to-be-reported beam from the beams of the cell is specifically: determining, by the terminal device, a beam whose filtered signal quality is greater than or equal to a preset third quality threshold as a to-be-reported beam based on the filtered signal quality of the beams of the cell, and/or determining, by the terminal device, a beam whose filtered signal quality is greater than or equal to the third quality threshold as a to-be-reported beam based on filtered signal quality of the beams of the neighboring cell; or determining, by the terminal device, N1 beams whose signal quality is the best from the plurality of beams of the cell as to-be-reported beams based on a beam reporting quantity N1 configured by the access network device, and/or determining, by the terminal device, N1 beams whose signal quality is the best from the plurality of beams of the neighboring cell as to-be-reported beams.

In a possible implementation, the obtaining, by the terminal device, the signal quality of the cell based on filtered signal quality of the plurality of beams is specifically:

selecting, by the terminal device, B beams whose filtered signal quality is the best from the plurality of beams, where B is greater than or equal to 1 and is less than or equal to N, and N is a beam quantity threshold and is greater than or equal to 1;

adding up, by the terminal device, the filtered signal quality of the B beams, to obtain a signal quality sum; and determining the signal quality of the cell based on the signal quality sum.

In a possible implementation, the selecting, by the terminal device, B beams whose filtered signal quality is the best from the plurality of beams is specifically:

selecting, by the terminal device, M beams whose signal quality is greater than a third quality threshold from the plurality of beams based on the filtered signal quality of the plurality of beams; and when M is greater than N and B is equal to N, selecting, by the terminal device, N beams from the M beams; or when M is less than N and B is equal to M, determining, by the terminal device, that the M beams are beams whose filtered signal quality is the best.

In a possible implementation, the determining the signal quality of the cell based on the signal quality sum is specifically:

determining, by the terminal device, the signal quality sum as the signal quality of the cell; or determining, by the terminal device, a ratio of the signal quality sum to N as the signal quality of the cell; or determining, by the terminal device, a ratio of the signal quality sum to B as the signal quality of the cell.

In a possible implementation, the measuring, by the terminal device, only some beams of the cell is specifically: measuring, by the terminal device, only synchronization signal blocks that are sent on B beams whose filtered signal quality is the best in the cell, where B is greater than or equal to 1 and is less than or equal to N, and N is a beam quantity threshold and is greater than or equal to 1; or measuring, by the terminal device, only a synchronization signal burst in which the synchronization signal blocks sent on the B beams are located. In other words, remaining beams are no longer measured.

In a possible implementation, the measuring, by the terminal device, only some beams of the cell is specifically: measuring, by the terminal device, only a synchronization signal block that is sent on a beam whose filtered signal quality is the best in the cell; or measuring, by the terminal device, only a synchronization signal burst in which a synchronization signal block sent on a beam whose filtered signal quality is the best is located.

A second aspect of this application provides a beam measurement method, including: sending, by an access network device, synchronization signal blocks on a plurality of beams of a cell; sending a message to a terminal device, where the message indicates a quantity of to-be-reported beams or at least one quality threshold of a to-be-reported beam of the terminal device, and the at least one quality threshold is used for beam measurement; and receiving, by the access network device, signal quality of the cell from the terminal device or an identifier that is of a to-be-reported beam of the cell and that is sent by the terminal device, where the signal quality of the cell is obtained by using the synchronization signal blocks.

In a possible implementation, the method further includes: receiving, by the access network device, signal quality of a neighboring cell of the cell that is sent by the terminal device or an identifier that is of a to-be-reported beam of the neighboring cell and that is sent by the terminal device.

A third aspect of this application provides a terminal device, including:

a receiving module, configured to receive a plurality of beams, where the plurality of beams carry synchronization signal blocks, and the plurality of beams belong to one cell; and a processing module, configured to obtain signal quality of the plurality of beams based on the synchronization signal blocks, where the signal quality of the plurality of beams includes signal quality of a same beam at different moments, where the processing module is further configured to obtain signal quality of the cell based on the signal quality of the plurality of beams.

In a possible implementation, at least one piece of signal quality of one beam in the signal quality of the plurality of beams is obtained by using a synchronization signal block of the beam.

In a possible implementation, that the processing module is further configured to obtain signal quality of the cell based on the signal quality of the plurality of beams includes:

separately performing filtering processing on the signal quality of the plurality of beams; and obtaining the signal quality of the cell based on filtered signal quality of the plurality of beams.

In a possible implementation, the receiving module is further configured to: receive only some beams of the cell when the signal quality of the cell exceeds a second quality threshold.

In a possible implementation, the processing module is further configured to:

obtain a synchronization signal burst set sending period of the cell;

that a receiving module is configured to receive the plurality of beams includes: receiving, within at least two synchronization signal burst set sending periods, the plurality of beams sent by an access network device; and that a processing module is configured to obtain signal quality of the plurality of beams based on the synchronization signal blocks includes:

determining that beam signal quality detected on synchronization signal blocks at a same corresponding position in the at least two synchronization signal burst set sending periods belongs to a same beam.

In a possible implementation, the processing module is further configured to:

obtain a synchronization signal burst set sending period of the cell;

that a receiving module is configured to receive the plurality of beams includes:

receiving, within the synchronization signal burst set sending period, the plurality of beams sent by an access network device; and that a processing module is configured to obtain signal quality of the plurality of beams based on the synchronization signal blocks includes:

determining, based on a beam timing index included in each received synchronization signal block, an identifier of a beam on which each synchronization signal block is sent; and determining that signal quality of beams having a same identifier belongs to a same beam.

In a possible implementation, that the processing module determines, based on a beam timing index included in each received synchronization signal block, an identifier of a beam on which each synchronization signal block is sent includes:

performing a modulo operation on the beam timing index included in each synchronization signal block and the synchronization signal burst set sending period, to obtain the identifier of the beam on which each synchronization signal block is sent; or determining that the beam timing index included in each synchronization signal block is the identifier of the beam on which each synchronization signal block is sent.

In a possible implementation, the terminal device further includes: a sending module, where the receiving module is further configured to receive a plurality of beams of a neighboring cell of the cell;

the processing module is further configured to:

obtain signal quality of the neighboring cell based on the plurality of beams of the neighboring cell; and determine an identifier of a to-be-reported beam from the plurality of beams of the neighboring cell, and/or determine an identifier of a to-be-reported beam from the plurality of beams of the cell; and the sending module is configured to send the signal quality of the neighboring cell, the signal quality of the cell, and the identifier of the to-be-reported beam of the cell and/or the identifier of the to-be-reported beam of the neighboring cell to an access network device.

In a possible implementation, that the processing module determines an identifier of a to-be-reported beam from the plurality of beams of the neighboring cell, and/or determines an identifier of a to-be-reported beam from the plurality of beams of the cell includes:

determining a beam whose filtered signal quality is greater than or equal to a preset third quality threshold as a to-be-reported beam based on the filtered signal quality of the beams of the cell, and/or determining a beam whose filtered signal quality is greater than or equal to the third quality threshold as a to-be-reported beam based on filtered signal quality of the beams of the neighboring cell; or determining N1 beams whose signal quality is the best from the plurality of beams of the cell as to-be-reported beams based on a beam reporting quantity N1 configured by the access network device, and/or determining N1 beams whose signal quality is the best from the plurality of beams of the neighboring cell as to-be-reported beams.

In a possible implementation, the processing module is further configured to:

select B beams whose filtered signal quality is the best from the plurality of beams, where B is greater than or equal to 1 and is less than or equal to N, and N is a beam quantity threshold and is greater than or equal to 1;

add up the filtered signal quality of the B beams, to obtain a signal quality sum; and determine the signal quality of the cell based on the signal quality sum.

In a possible implementation, that the processing module selects B beams whose filtered signal quality is the best from the plurality of beams includes:

selecting M beams whose signal quality is greater than a third quality threshold from the plurality of beams based on the filtered signal quality of the plurality of beams; and when M is greater than N and B is equal to N, selecting N beams from the M beams; or when M is less than N and B is equal to M, determining that the M beams are beams whose filtered signal quality is the best.

In a possible implementation, that the processing module determines the signal quality of the cell based on the signal quality sum includes:

determining the signal quality sum as the signal quality of the cell; or determining a ratio of the signal quality sum to N as the signal quality of the cell; or determining a ratio of the signal quality sum to B as the signal quality of the cell.

In a possible implementation, that the receiving module receives only some beams of the cell includes:

receiving only synchronization signal blocks that are sent on B beams whose filtered signal quality is the best in the cell, where B is greater than or equal to 1 and is less than or equal to N, and N is a beam quantity threshold and is greater than or equal to 1; or receiving only a synchronization signal burst in which the synchronization signal blocks sent on the B beams are located.

In a possible implementation, that the receiving module receives only some beams of the cell includes:

receiving only a synchronization signal block that is sent on a beam whose filtered signal quality is the best in the cell; or receiving only a synchronization signal burst in which a synchronization signal block sent on a beam whose filtered signal quality is the best is located.

A fourth aspect of this application provides an access network device, including:

a sending module, configured to send synchronization signal blocks on a plurality of beams of a cell, where the sending module is further configured to send a message to a terminal device, where the message indicates a quantity of to-be-reported beams or at least one quality threshold of a to-be-reported beam of the terminal device, and the at least one quality threshold is used for beam measurement; and a receiving module, configured to receive signal quality of the cell from the terminal device or an identifier that is of a to-be-reported beam of the cell and that is sent by the terminal device, where the signal quality of the cell is obtained by using the synchronization signal blocks.

In a possible implementation, the receiving module is further configured to:

receive signal quality of a neighboring cell of the cell that is sent by the terminal device or an identifier that is of a to-be-reported beam of the neighboring cell and that is sent by the terminal device.

A fifth aspect of this application provides a terminal device, including a processor and a memory, where the memory is configured to store an instruction, and the processor is configured to execute the instruction stored in the memory, so that the terminal device performs the following method:

measuring signal quality of a plurality of beams, where the signal quality of the plurality of beams is obtained by using synchronization signal blocks, the signal quality of the plurality of beams includes signal quality of a same beam at different moments, and the plurality of beams belong to one cell; and obtaining signal quality of the cell based on the signal quality of the plurality of beams.

In a possible implementation, at least one piece of signal quality of one beam in the signal quality of the plurality of beams is obtained by using a synchronization signal block of the beam.

In a possible implementation, that the processor obtains signal quality of the cell based on the signal quality of the plurality of beams includes:

separately performing filtering processing on the signal quality of the plurality of beams; and obtaining the signal quality of the cell based on filtered signal quality of the plurality of beams.

In a possible implementation, the processor is further configured to:

measure only some beams of the cell when the signal quality of the cell exceeds a second quality threshold.

In a possible implementation, the processor is further configured to:

obtain a synchronization signal burst set sending period of the cell; and that the processor measures signal quality of a plurality of beams includes:

detecting, within at least two synchronization signal burst set sending periods, synchronization signal blocks that are sent by an access network device on the plurality of beams, to obtain the signal quality of the plurality of beams; and determining that beam signal quality detected on synchronization signal blocks at a same corresponding position in the at least two synchronization signal burst set sending periods belongs to a same beam.

In a possible implementation, the processor is further configured to:

obtain a synchronization signal burst set sending period of the cell; and that the processor measures signal quality of a plurality of beams includes:

detecting, within the synchronization signal burst set sending period, synchronization signal blocks that are sent by an access network device on the plurality of beams, to obtain the signal quality of the plurality of beams;

determining, based on a beam timing index included in each received synchronization signal block, an identifier of a beam on which each synchronization signal block is sent; and determining that signal quality of beams having a same identifier belongs to a same beam.

In a possible implementation, that the processor determines, based on a beam timing index included in each received synchronization signal block, an identifier of a beam on which each synchronization signal block is sent includes:

performing a modulo operation on the beam timing index included in each synchronization signal block and the synchronization signal burst set sending period, to obtain the identifier of the beam on which each synchronization signal block is sent; or determining that the beam timing index included in each synchronization signal block is the identifier of the beam on which each synchronization signal block is sent.

In a possible implementation, the processor is further configured to:

measure a neighboring cell of the cell, to obtain signal quality of the neighboring cell;

determine an identifier of a to-be-reported beam from the plurality of beams of the neighboring cell, and/or determine an identifier of a to-be-reported beam from the plurality of beams of the cell; and send the signal quality of the neighboring cell, the signal quality of the cell, and the identifier of the to-be-reported beam of the cell and/or the identifier of the to-be-reported beam of the neighboring cell to an access network device.

In a possible implementation, that the processor determines an identifier of a to-be-reported beam from the beams of the neighboring cell, and/or determines an identifier of a to-be-reported beam from the beams of the cell includes:

determining a beam whose filtered signal quality is greater than or equal to a preset third quality threshold as a to-be-reported beam based on the filtered signal quality of the beams of the cell, and/or determining a beam whose filtered signal quality is greater than or equal to the third quality threshold as a to-be-reported beam based on filtered signal quality of the beams of the neighboring cell; or determining N1 beams whose signal quality is the best from the plurality of beams of the cell as to-be-reported beams based on a beam reporting quantity N1 configured by the access network device, and/or determining N1 beams whose signal quality is the best from the plurality of beams of the neighboring cell as to-be-reported beams.

In a possible implementation, that the processor obtains the signal quality of the cell based on filtered signal quality of the plurality of beams includes:

selecting B beams whose filtered signal quality is the best from the plurality of beams, where B is greater than or equal to 1 and is less than or equal to N, and N is a beam quantity threshold and is greater than or equal to 1;

adding up the filtered signal quality of the B beams, to obtain a signal quality sum; and determining the signal quality of the cell based on the signal quality sum.

In a possible implementation, that the processor selects B beams whose filtered signal quality is the best from the plurality of beams includes:

selecting M beams whose signal quality is greater than a third quality threshold from the plurality of beams based on the filtered signal quality of the plurality of beams; and when M is greater than N and B is equal to N, selecting N beams from the M beams; or when M is less than N and B is equal to M, determining that the M beams are beams whose filtered signal quality is the best.

In a possible implementation, that the processor determines the signal quality of the cell based on the signal quality sum includes:

determining the signal quality sum as the signal quality of the cell; or determining a ratio of the signal quality sum to N as the signal quality of the cell; or determining a ratio of the signal quality sum to B as the signal quality of the cell.

In a possible implementation, that the processor measures only some beams of the cell includes:

measuring only synchronization signal blocks that are sent on B beams whose filtered signal quality is the best in the cell, where B is greater than or equal to 1 and is less than or equal to N, and N is a beam quantity threshold and is greater than or equal to 1; or measuring only a synchronization signal burst in which the synchronization signal blocks sent on the B beams are located.

In a possible implementation, that the processor measures only some beams of the cell includes:

measuring only a synchronization signal block that is sent on a beam whose filtered signal quality is the best in the cell; or measuring only a synchronization signal burst in which a synchronization signal block that is sent on a beam whose filtered signal quality is the best is located.

A sixth aspect of this application provides an access network device, including a processor and a memory, where the memory is configured to store an instruction, and the processor is configured to execute the instruction stored in the memory, so that the access network device performs the following method:

sending synchronization signal blocks on a plurality of beams of a cell;

sending, by the access network device, a message to a terminal device, where the message indicates a quantity of to-be-reported beams or at least one quality threshold of a to-be-reported beam of the terminal device, and the at least one quality threshold is used for beam measurement; and receiving, by the access network device, signal quality of the cell from the terminal device or an identifier that is of a to-be-reported beam of the cell and that is sent by the terminal device, where the signal quality of the cell is obtained by using the synchronization signal blocks.

In a possible implementation, the processor is further configured to:

receive signal quality of a neighboring cell of the cell that is sent by the terminal device or an identifier that is of a to-be-reported beam of the neighboring cell and that is sent by the terminal device.

According to the measurement method, the terminal device, and the access network device provided in this application, the terminal device measures signal quality of a plurality of beams, where the signal quality of the plurality of beams is obtained by using synchronization signal blocks, the signal quality of the plurality of beams includes signal quality of a same beam at different moments, and the plurality of beams belong to one cell; and obtains signal quality of the cell based on the signal quality of the plurality of beams. In this way, cell measurement based on a synchronization signal is implemented, and the signal quality of the cell obtained based on the signal quality of the plurality of beams at the different moments is more accurate.

DETAILED DESCRIPTION OF ILLUSTRATIVE EMBODIMENTS

Figure 1:
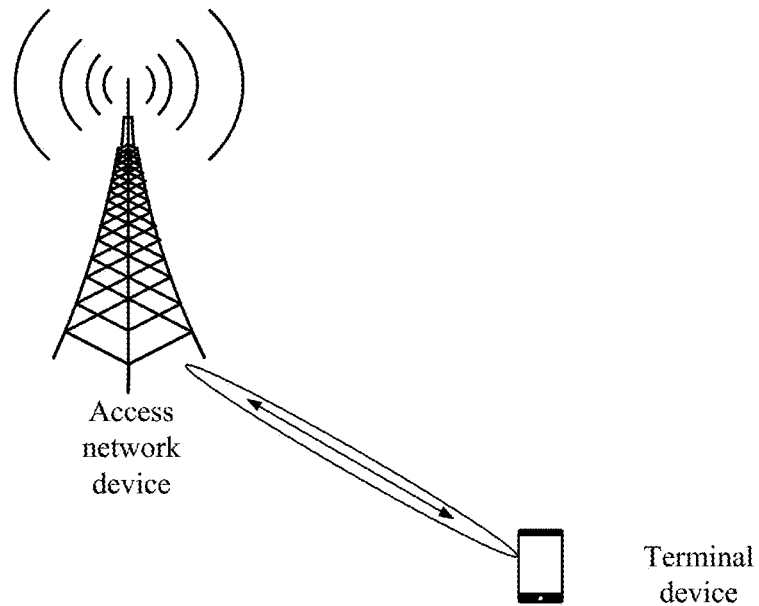
FIG. 1 is a schematic architectural diagram of a communications system to which this application can be applied.

This application provides a beam measurement method, and the method may be applied to an existing communications system. FIG. 1 is a schematic architectural diagram of a communications system to which this application can be applied. As shown in FIG. 1, the communications system includes an access network device and a terminal device, and there may be one or more terminal devices. The communications system may be a Global System for Mobile Communications (Global System for Mobile Communications, GSM for short), a Code Division Multiple Access (Code Division Multiple Access, CDMA for short) system, a Wideband Code Division Multiple Access (Wideband Code Division Multiple Access, WCDMA for short) system, a Long Term Evolution (Long Term Evolution, LTE for short) system, or a 5th generation mobile communications (5th-Generation, 5G for short) system. Correspondingly, the access network device may be a base transceiver station (Base Transceiver Station, BTS for short) in the GSM system or the CDMA system, or may be a NodeB (NodeB, NB for short) in the WCDMA system, or may be an evolved NodeB (evolved NodeB, eNB for short), an access point (access point, AP), or a relay station in the LTE system, or may be a base station in the 5G system, or the like. This is not limited herein.

The terminal device may be a wireless terminal. The wireless terminal may be a device that provides voice and/or data connectivity to a user, a handheld device having a wireless connection function, or another processing device connected to a wireless modem. The wireless terminal may communicate with at least one core network by using a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. The wireless terminal may also be referred to as a subscriber unit (Subscriber Unit), a subscriber station (Subscriber Station), a mobile station (Mobile Station), a mobile console (Mobile Station), a remote station (Remote Station), an access point (Access Point), a remote terminal (Remote Terminal), an access terminal (Access Terminal), a user terminal (User Terminal), user equipment (User Equipment, UE for short), or a user agent (User Agent). This is not limited herein.

It should be noted that, signal quality mentioned in this application is a measurement result of a signal, and a signal quality indicator includes but is not limited to: reference signal received power (Reference Signal Received Power, RSRP for short), reference signal received quality (Reference Signal Received Quality, RSRQ for short), a signal to interference plus noise ratio (Signal to Interference & Noise Ratio, SINR for short), and a received signal strengthen indicator (Received Signal Strengthen Indicator, RSSI for short). A beam mentioned in this application is a wireless signal sent in a specific direction, such as a synchronization signal block (SS block) or a channel state information-reference signal (Channel State Information-Reference Signals, CSI-RS for short). For reception by a terminal device, reception of an SS block may be considered as reception of a beam, and reception of a CSI-RS may also be considered as reception of a beam.

Figure 2:
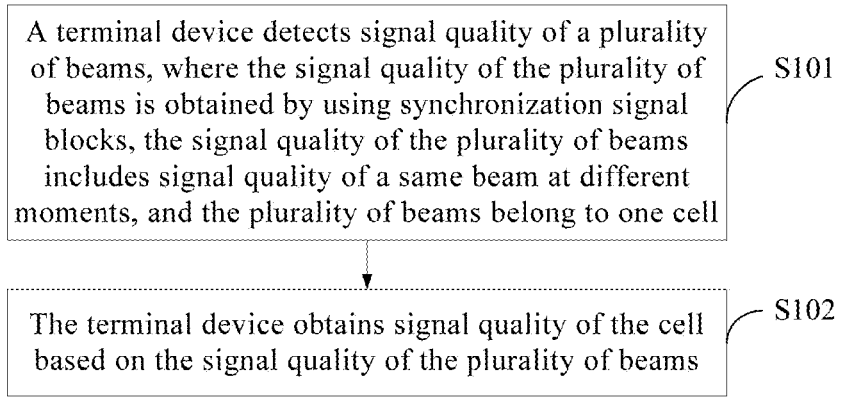
FIG. 2 is a flowchart of a measurement method according to Embodiment 1.

FIG. 2 is a flowchart of a measurement method according to Embodiment 1. As shown in FIG. 2, the measurement method includes the following steps.

Step S101: A terminal device detects signal quality of a plurality of beams, where the signal quality of the plurality of beams is obtained by using synchronization signal blocks, the signal quality of the plurality of beams includes signal quality of a same beam at different moments, and the plurality of beams belong to one cell.

The terminal device may be in an idle state, or may be in a connected state. For a terminal device in a connected state, the cell is a serving cell of the terminal device; and for a terminal device in an idle state or an inactive state, the cell is a cell on which the terminal device camps. An access network device to which the cell belongs uses K beams to send synchronization signal blocks in a polling manner, and different beams cover different directions. One synchronization signal block is sent on each beam, and all the K beams cover all directions of the cell, so that the terminal device in the cell can receive the synchronization signal block at any position.

Specifically, the access network device may send the synchronization signal blocks on the K beams based on a synchronization signal burst set sending period. The synchronization signal burst set sending period includes one or more synchronization signal bursts, there is a time interval between adjacent synchronization signal bursts, each synchronization signal burst includes one or more synchronization signal blocks, and each synchronization signal block is sent on one beam. For example, the access network device sends a first synchronization signal block on a first beam at a first moment, and sends a second synchronization signal block on a second beam at a second moment, until all synchronization signal blocks are sent. The access network device sends the synchronization signal blocks on the K beams in a polling manner, but due to a position change of the terminal device or another factor, it is possible that the terminal device detects only D beams in the K beams, where $D \geq 1$, $D \leq K$, and $K \geq 1$.

The synchronization signal block may include a primary synchronization signal and a secondary synchronization signal. Optionally, the synchronization signal block may further include physical broadcast information. In a same synchronization signal block, a primary synchronization signal, a secondary synchronization signal, and physical broadcast information may be separated in time domain or in frequency domain. For example, the synchronization signal block includes three symbols, and the access network device may use a first symbol to send the primary synchronization signal, use a second symbol to send the secondary synchronization signal, and use a third symbol to send the physical broadcast information.

Because the synchronization signal blocks are sent periodically in a circular manner, some synchronization signal blocks are repeatedly sent by a same beam at different moments in time domain, and these synchronization signal blocks all can reflect signal quality of the beam. Therefore, the terminal device in this embodiment needs to identify signal quality of each beam at different moments.

Figure 3:
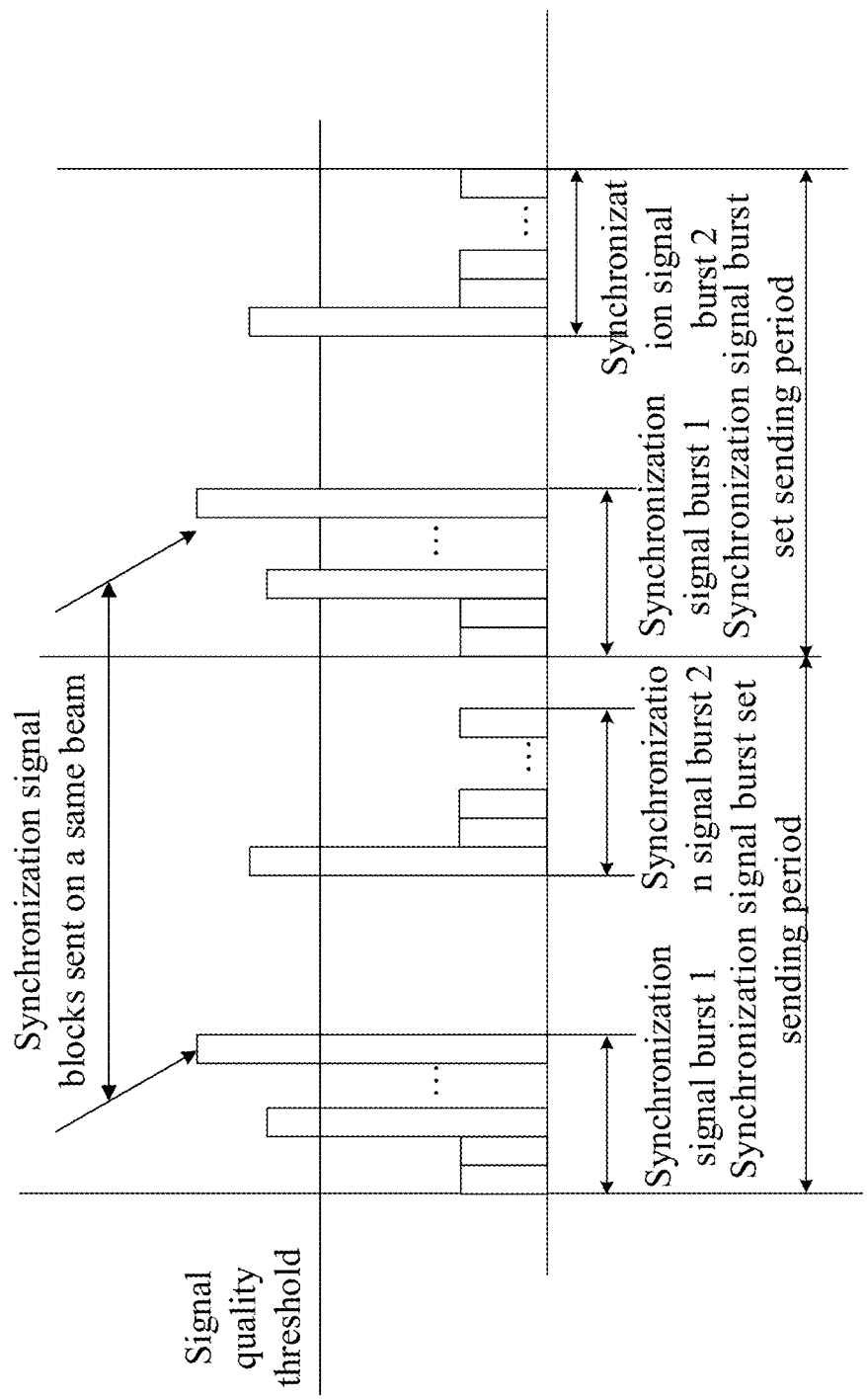
FIG. 3 is a schematic diagram of sending a synchronization signal block in time domain.

In a first implementation, the terminal device obtains a synchronization signal burst set sending period of the cell. The synchronization signal burst set sending period includes one or more synchronization signal bursts, there is a time interval between adjacent synchronization signal bursts, each synchronization signal burst includes one or more synchronization signal blocks, and each synchronization signal block is sent on one beam. FIG. 3 is a schematic diagram of sending a synchronization signal block in time domain. FIG. 3 shows two synchronization signal burst set sending periods, where each synchronization signal burst set sending period includes two synchronization signal bursts: a synchronization signal burst 1 and a synchronization signal burst 2.

In FIG. 3, two synchronization signal blocks that are located at a same corresponding position are sent by using a same beam. Therefore, the terminal device may detect, within at least two synchronization signal burst set sending periods based on the synchronization signal burst set sending period, synchronization signal blocks that are sent by the access network device on the plurality of beams, to obtain signal quality of the plurality of beams; and determine that beam signal quality detected on synchronization signal blocks at a same corresponding position in the at least two synchronization signal burst set sending periods belongs to a same beam, where the same corresponding position is a synchronization signal block at a same position in a same synchronization signal burst. For example, a second synchronization signal block of a synchronization signal burst 1 in a first sending period and a second synchronization signal block of a synchronization signal burst 1 in a second sending period are located at a same corresponding position.

In a second implementation, the terminal device not only obtains a synchronization signal burst set sending period of the cell, but also obtains synchronization signal burst configuration information, where the synchronization signal burst configuration information includes a quantity of synchronization signal bursts included in the synchronization signal burst set sending period, and a length and a starting position of each synchronization signal burst. The terminal device measures signal quality of a synchronization signal in synchronization signal bursts of at least two synchronization signal burst set sending periods based on the synchronization signal burst configuration information. Compared with the first implementation, in the second implementation, the terminal device detects the signal quality of the beam only in the synchronization signal burst, and does not need to detect the signal quality of the beam in the entire synchronization signal burst set sending period, thereby reducing power consumption of the terminal device.

In a third implementation, in addition to a synchronization signal, the synchronization signal block further carries a beam timing index. The terminal device obtains a synchronization signal burst set sending period of the cell; detects, within the synchronization signal burst set sending period, synchronization signal blocks that are sent by the access network device on the plurality of beams, to obtain the signal quality of the plurality of beams; then determines, based on a beam timing index included in each received synchronization signal block, an identifier of a beam on which each synchronization signal block is sent; and determines that signal quality of beams having a same identifier belongs to a same beam. The beam timing index may occupy a separate symbol or field in the synchronization signal block, or may be carried in the physical broadcast information, that is, the beam timing index is sent by reusing physical resources of a broadcast message.

Optionally, that the terminal device determines, based on a beam timing index included in each received synchronization signal block, an identifier of a beam on which each synchronization signal block is sent is specifically: performing, by the terminal device, a modulo operation on the beam timing index included in each synchronization signal block and the synchronization signal burst set sending period, to obtain the identifier of the beam on which each synchronization signal block is sent; or determining, by the terminal device, that the beam timing index included in each synchronization signal block is the identifier of the beam on which each synchronization signal block is sent. The latter solution is used when the timing index is unique only in the synchronization signal burst set sending period. The former solution is used when the timing index is unique in one or more synchronization signal burst set sending periods.

In all of the foregoing three implementations, the terminal device needs to obtain the synchronization signal burst set sending period of the cell, and the synchronization signal burst set sending period may be specifically obtained in the following several manners:

(1) The terminal device uses a synchronization signal burst set sending period of a previously camped-on cell as the synchronization signal burst set sending period of the cell. A previously camped-on cell and a currently camped-on cell may be a same cell or neighboring cells, and synchronization signal burst set sending periods of the neighboring cells may be the same. Therefore, the terminal device may use the synchronization signal burst set sending period of the previously camped-on cell as the synchronization signal burst set sending period of the cell.

(2) The terminal device searches for a synchronization signal block, reads a system message based on a position of the found synchronization signal block, and obtains the synchronization signal burst set sending period of the cell based on the system message.

(3) The terminal device receives a synchronization signal burst set sending period that is of the cell and that is configured by the access network device.

(4) The terminal device determines a predefined period as the synchronization signal burst set sending period of the cell.

Step S102: The terminal device obtains signal quality of the cell based on the signal quality of the plurality of beams.

The terminal device separately performs filtering processing on the signal quality of the plurality of beams, to obtain filtered signal quality of each beam; and obtains the signal quality of the cell based on the filtered signal quality of the plurality of beams.

That the terminal device separately performs filtering processing on the signal quality of the plurality of beams is specifically: averaging, by the terminal device, signal quality of each beam at different moments, to obtain filtered signal quality of each beam. For example, if the terminal device obtains signal quality of a beam 1 and a beam 2 at three different moments, the terminal device averages the signal quality of the beam 1 at the three different moments to obtain filtered signal quality of the beam 1, and averages the signal quality of the beam 2 at the three different moments to obtain filtered signal quality of the beam 2. Alternatively, the terminal device performs weighted averaging on signal quality of each beam at different moments, to obtain filtered signal quality of each beam, where a weighted value of the weighted averaging may be predefined, or may be preconfigured by the access network device.

Assuming that the terminal device detects D beams, that the terminal device obtains the signal quality of the cell based on the filtered signal quality of the plurality of beams is specifically: selecting, by the terminal device, B beams whose filtered signal quality is the best from the D beams, where B is greater than or equal to 1 and is less than or equal to N, and N is a beam quantity threshold and is greater than or equal to 1; adding up, by the terminal device, the filtered signal quality of the B beams, to obtain a signal quality sum; and determining, by the terminal device, the signal quality of the cell based on the signal quality sum, where N is predefined by the terminal device, or N is configured by the access network device.

In an implementation, the terminal device selects M beams whose signal quality is greater than a third quality threshold from the plurality of beams based on the filtered signal quality of the plurality of beams. When M is greater than N, the terminal device determines that B is equal to N, and the terminal device selects N beams from the M beams. The terminal device may preferentially select N beams whose signal quality is the best, or may randomly select N beams. Certainly, the terminal device may also select N beams based on signal quality or another condition. When M is less than N, the terminal device determines that B is equal to M, and the terminal device determines that the M beams are beams whose filtered signal quality is the best. The third quality threshold may be configured by the access network device.

In another implementation, the terminal device obtains the beam quantity threshold N, determines that B is equal to N, and selects N beams whose signal quality is the best from the plurality of beams.

The determining, by the terminal device, the signal quality of the cell based on the signal quality sum is specifically: determining, by the terminal device, the signal quality sum as the signal quality of the cell; or determining, by the terminal device, a ratio of the signal quality sum to N as the signal quality of the cell; or determining, by the terminal device, a ratio of the signal quality sum to B as the signal quality of the cell.

In this embodiment, the terminal device measures the signal quality of the plurality of beams, where the signal quality of the plurality of beams is obtained by using the synchronization signal blocks, the signal quality of the plurality of beams includes the signal quality of the same beam at different moments, and the plurality of beams belong to one cell; and the terminal device obtains the signal quality of the cell based on the signal quality of the plurality of beams. In this way, cell measurement based on a synchronization signal is implemented, and the signal quality of the cell obtained based on the signal quality of the plurality of beams at the different moments is more accurate.

Figure 4:
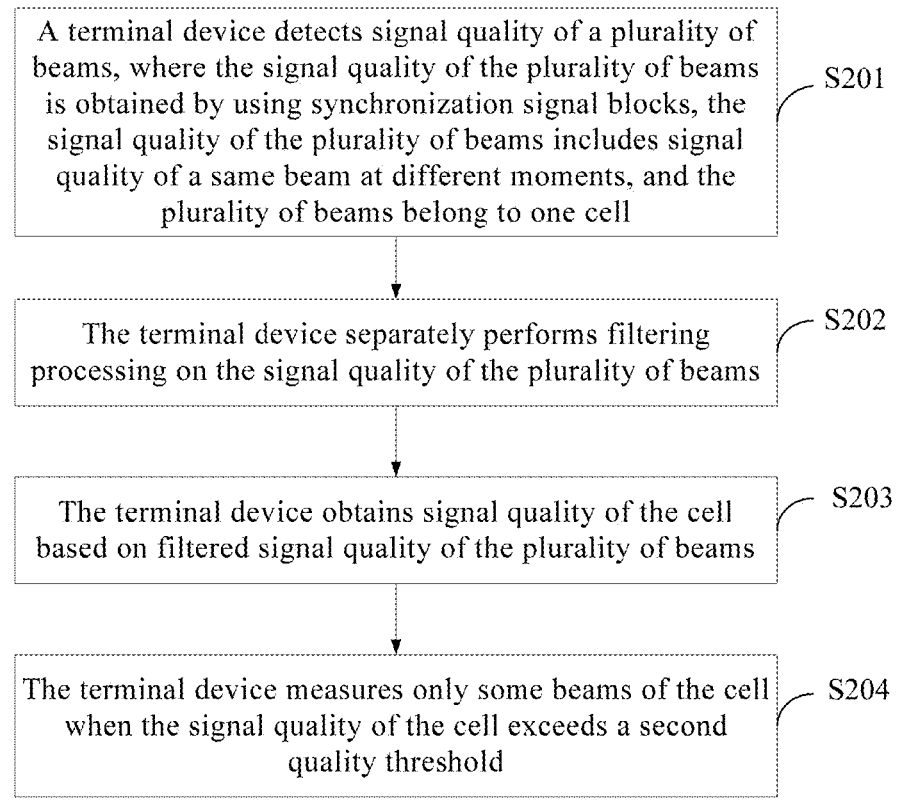
FIG. 4 is a flowchart of a measurement method according to Embodiment 2.

On the basis of Embodiment 1, FIG. 4 is a flowchart of a measurement method according to Embodiment 2. As shown in FIG. 4, the method provided in this embodiment includes the following steps.

Step S201: A terminal device detects signal quality of a plurality of beams, where the signal quality of the plurality of beams is obtained by using synchronization signal blocks, the signal quality of the plurality of beams includes signal quality of a same beam at different moments, and the plurality of beams belong to one cell.

Step S202: The terminal device separately performs filtering processing on the signal quality of the plurality of beams.

Step S203: The terminal device obtains signal quality of the cell based on filtered signal quality of the plurality of beams.

For specific implementations of steps S201 to S203, refer to related descriptions in Embodiment 1, and details are not described herein again.

Step S204: The terminal device measures only some beams of the cell when the signal quality of the cell exceeds a second quality threshold.

That the signal quality of the cell exceeds a second quality threshold means that the signal quality of the cell is greater than or equal to the second quality threshold. In this embodiment, the second quality threshold may be less than, greater than, or equal to a first quality threshold. The first quality threshold is a threshold used for the terminal device to determine whether to measure a neighboring cell. The terminal device stops measuring a neighboring cell when the signal quality of the cell exceeds the first quality threshold. That the signal quality of the cell exceeds the first quality threshold means that the signal quality of the cell is greater than or equal to the first quality threshold. The terminal device starts measuring a neighboring cell when the signal quality of the cell is less than the first quality threshold. The first quality threshold and the second quality threshold may be sent by an access network device to the terminal device by using a message.

When the first quality threshold is equal to the second quality threshold, the terminal device not only stops measuring a neighboring cell of the cell but also stops measuring the some beams of the cell, provided that the signal quality of the cell is greater than the first quality threshold. When the first quality threshold is less than the second quality threshold, if the signal quality of the cell is greater than or equal to the first quality threshold and is less than the second quality threshold, the terminal device stops measuring a neighboring cell of the cell and measures all beams of the cell; or if the signal quality of the cell is greater than or equal to the first quality threshold and is greater than or equal to the second quality threshold, the terminal device not only stops measuring a neighboring cell of the cell but also stops measuring the some beams of the cell. When the first quality threshold is greater than the second quality threshold, if the signal quality of the cell is greater than or equal to the second quality threshold, and the signal quality of the cell is also greater than or equal to the first quality threshold, the terminal device not only stops measuring a neighboring cell of the cell but also stops measuring the some beams of the cell; or if the signal quality of the cell is greater than or equal to the second quality threshold and is less than or equal to the first quality threshold, the terminal device stops measuring the some beams of the cell.

In this embodiment, that the terminal device measures only some beams of the cell is specifically: measuring, by the terminal device, only synchronization signal blocks that are sent on B beams whose filtered signal quality is the best in the cell, where B is greater than or equal to 1 and is less than or equal to N, N is a beam quantity threshold and is greater than or equal to 1, and N may be sent by the access network device to the terminal device by using a message; or measuring, by the terminal device, only a synchronization signal burst in which the synchronization signal blocks sent on the B beams are located; or measuring, by the terminal device, only a synchronization signal block that is sent on a beam whose filtered signal quality is the best in the cell; or measuring, by the terminal device, only a synchronization signal burst in which a synchronization signal block sent on a beam whose filtered signal quality is the best is located.

Optionally, the terminal device determines an identifier of a to-be-reported beam from the beams of the cell. Specifically, the terminal device determines a beam whose filtered signal quality is greater than or equal to a preset third quality threshold as a to-be-reported beam based on the filtered signal quality of the beams of the cell; or the terminal device determines N1 beams whose signal quality is the best from the beams of the cell as to-be-reported beams based on a maximum beam reporting quantity N1 configured by the access network device; or the terminal device determines beams whose signal quality meets a specific condition from the beams of the cell as to-be-reported beams based on a maximum beam reporting quantity N1 configured by the access network device, where a quantity of the beams is less than or equal to N1, and the specific condition is, for example, that the signal quality exceeds a specific threshold, or that a signal quality deviation from quality of a beam whose signal quality is the best is less than a specific threshold.

In this embodiment, the terminal device measures only the some beams of the cell when the signal quality of the cell exceeds the second quality threshold. Measuring the some beams of the cell reduces power consumption of the terminal device in beam measurement.

Figure 5:
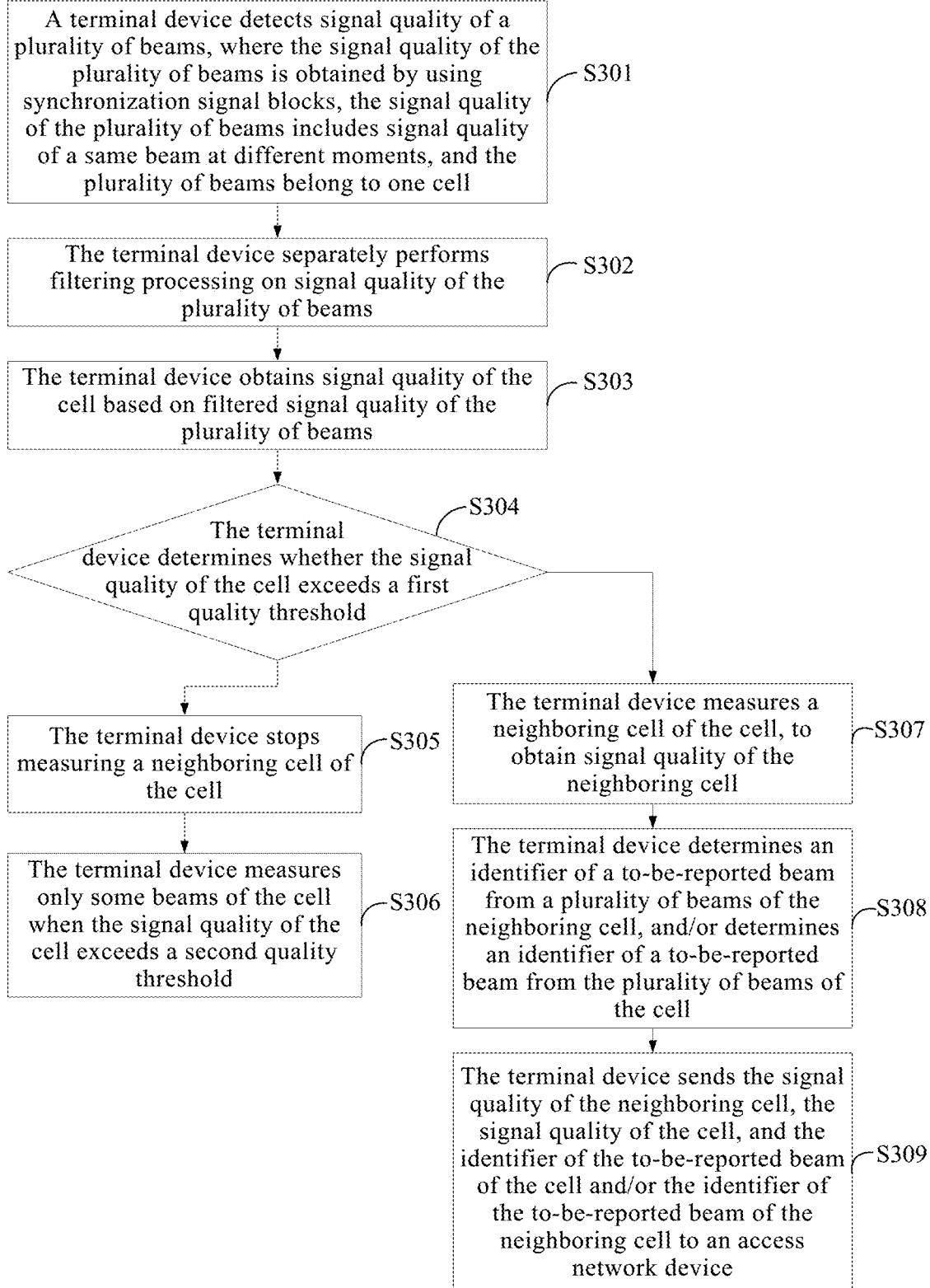
FIG. 5 is a flowchart of a measurement method according to Embodiment 3.

On the basis of Embodiment 2, FIG. 5 is a flowchart of a measurement method according to Embodiment 3. As shown in FIG. 5, the method provided in this embodiment includes the following steps.

Step S301: A terminal device detects signal quality of a plurality of beams, where the signal quality of the plurality of beams is obtained by using synchronization signal blocks, the signal quality of the plurality of beams includes signal quality of a same beam at different moments, and the plurality of beams belong to one cell.

Step S302: The terminal device separately performs filtering processing on the signal quality of the plurality of beams.

Step S303: The terminal device obtains signal quality of the cell based on filtered signal quality of the plurality of beams.

Step S304: The terminal device determines whether the signal quality of the cell exceeds a first quality threshold.

When the signal quality of the cell exceeds the first quality threshold, step S305 is to be performed; or when the signal quality of the cell does not exceed the first quality threshold, step S307 is to be performed.

Step S305: The terminal device stops measuring a neighboring cell of the cell.

Step S306: The terminal device measures only some beams of the cell when the signal quality of the cell exceeds a second quality threshold.

For specific implementations of steps S3001 to S306, refer to related descriptions in Embodiment 1 and Embodiment 2, and details are not described herein again.

Step S307: The terminal device measures a neighboring cell of the cell, to obtain signal quality of the neighboring cell.

Specifically, the terminal device detects signal quality of a plurality of beams of the neighboring cell, where the signal quality of the plurality of beams of the neighboring cell is obtained by using synchronization signal blocks, and the signal quality of the plurality of beams of the neighboring cell includes signal quality of a same beam at different moments; and then, the terminal device obtains the signal quality of the neighboring cell based on the signal quality of the plurality of beams of the neighboring cell. In this embodiment, a specific implementation method used by the terminal device to measure the neighboring cell to obtain the signal quality of the neighboring cell is the same as the method, in Embodiment 1, used by the terminal device to measure the cell in which the terminal device is located, and details are not described herein again.

Step S308: The terminal device determines an identifier of a to-be-reported beam from a plurality of beams of the neighboring cell, and/or determines an identifier of a to-be-reported beam from the plurality of beams of the cell.

In this embodiment, that the terminal device determines an identifier of a to-be-reported beam from a plurality of beams of the neighboring cell is specifically: determining, by the terminal device, a beam whose filtered signal quality is greater than or equal to a preset third quality threshold as a to-be-reported beam based on filtered signal quality of the plurality of beam of the neighboring cell; or determining, by the terminal device, N1 beams whose signal quality is the best from the beams of the neighboring cell as to-be-reported beams based on a maximum beam reporting quantity N1 configured by an access network device; or determining, by the terminal device, beams whose signal quality meets a specific condition from the beams of the neighboring cell as to-be-reported beams based on a maximum beam reporting quantity N1 configured by the access network device, where a quantity of the beams is less than or equal to N1. The specific condition is, for example, that the signal quality exceeds a specific threshold, or that a signal quality deviation from quality of a beam whose signal quality is the best is less than a specific threshold. The method used by the terminal device to determine an identifier of a to-be-reported beam from the plurality of beams of the cell is the same as the method for determining an identifier of a to-be-reported beam from the plurality of beams of the neighboring cell, and details are not described herein again. The third quality threshold and the maximum beam reporting quantity N1 are sent by the access network device to the terminal device by using a message.

Step S309: The terminal device sends the signal quality of the neighboring cell, the signal quality of the cell, and the identifier of the to-be-reported beam of the cell and/or the identifier of the to-be-reported beam of the neighboring cell to an access network device.

When the identifier of the to-be-reported beam of the cell is reported, the identifier is sorted based on signal quality of the beams. The terminal device may sort the identifier in descending order or in ascending order based on the signal quality of the beams. Likewise, when the identifier of the to-be-reported beam of the neighboring cell is reported, the identifier is also sequenced based on signal quality of the beams.

The access network device may control the terminal device to perform neighboring cell handover based on the signal quality of the cell, the signal quality of the neighboring cell, and the identifier of the to-be-reported beam of the neighboring cell and/or the identifier of the to-be-reported beam of the cell. For example, when the signal quality of the cell is lower than a threshold and the signal quality of the neighboring cell is relatively good, the terminal device determines to perform neighboring cell handover. During neighboring cell handover, the access network device learns, based on the identifier of the to-be-reported beam, which beams of the neighboring cell are of relatively good quality, so that when controlling the terminal device to perform neighboring cell handover, the access network device determines that the beams having relatively good quality are beams to be allocated to and used by the terminal device to configure the to-be-accessed neighboring cell. For example, if the access network device determines, based on the identifier of the to-be-reported beam, that a beam 3 and a beam 4 in the neighboring cell are relatively good, the access network device instructs, during neighboring cell handover, the terminal device to use the beam 3 and the beam 4 to access to the neighboring cell, and allocates access resources used by the beam 3 and the beam 4 to the terminal device.

In this embodiment, the terminal device measures the signal quality of the neighboring cell by using the same method, determines the identifier of the to-be-reported beam from the plurality of beams of the neighboring cell and/or the identifier of the to-be-reported beam from the plurality of beams of the cell, and then sends the signal quality of the neighboring cell, the signal quality of the cell, and the identifier of the to-be-reported beam of the cell and/or the identifier of the to-be-reported beam of the neighboring cell to the access network device. Therefore, when determining, based on the signal quality of the neighboring cell and the signal quality of the cell, to control the terminal device to perform neighboring cell handover, the access network device learns, based on the identifier of the to-be-reported beam, which beams of the neighboring cell have relatively good quality, so that when controlling the terminal device to perform neighboring cell handover, the access network device determines the beams having relatively good quality as beams used by the terminal device to configure the to-be-accessed neighboring cell, thereby increasing a success rate of neighboring cell handover.

Figure 6:
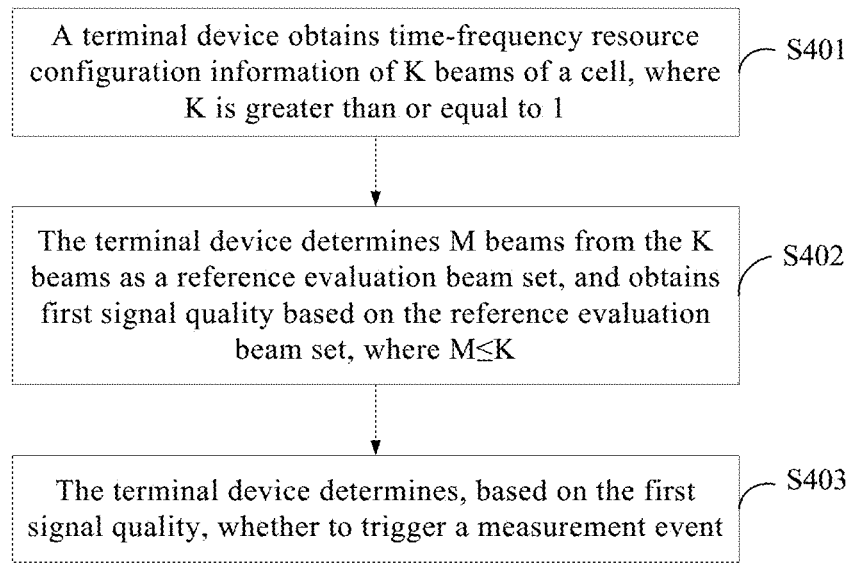
FIG. 6 is a flowchart of a measurement method according to Embodiment 4.

FIG. 6 is a flowchart of a measurement method according to Embodiment 4. Unlike the measurement methods in Embodiment 1 to Embodiment 3 in which the synchronization signal block is measured, a reference signal is measured in this embodiment. As shown in FIG. 6, the method provided in this embodiment includes the following steps.

Step S401: A terminal device obtains time-frequency resource configuration information of K beams of a cell, where K is greater than or equal to 1.

A synchronization signal belongs to a common signal, and is sent to all terminal devices in the cell rather than for a specific terminal device. However, a reference signal may be sent to a specific terminal device, and time-frequency resources used by different terminal devices for sending reference signals are different. Therefore, before measuring signal quality of the reference signal, the terminal device needs to obtain the time-frequency resource configuration information of the K beams of the cell.

Step S402: The terminal device determines M beams from the K beams as a reference evaluation beam set, and obtains first signal quality based on the reference evaluation beam set, where M≤K.

In this embodiment, the terminal device separately detects, based on time-frequency resource configuration information of the beams in the reference evaluation beam set, reference signals sent on the beams, to obtain signal quality of the beams; and then obtains the first signal quality based on the signal quality of the beams. The reference signal may be a CSI-RS, the configuration information of each beam corresponds to resource configuration information of the CSI-RS, and the resource configuration information of each CSI-RS includes information about a corresponding cell.

Optionally, the terminal device further receives indication information sent by an access network device, where the indication information is used to indicate whether the terminal device uses a CSI-RS or a synchronization signal block when performing measurement event evaluation. If the indication information indicates that the terminal device uses the CSI-RS to perform event evaluation, the terminal device determines, based on the indication information, to use the CSI-RS to perform first signal evaluation and event triggering. Optionally, the indication information is carried in a configuration of a measurement event. For example, for a measurement event A3, the access network device instructs the terminal device to use the CSI-RS to perform event evaluation on the measurement event A3.

Optionally, the terminal device receives, as a reference evaluation beam set, M beams that are specified by the access network device, where the M beams are beams selected from the K beams. The access network device may specify different M beams for the terminal device based on different measurement events. For example, for a measurement event A3, the access network device specifies some of the K beams as a reference evaluation beam set; and for a measurement event A4, the access network device selects remaining beams as a reference evaluation beam set.

Alternatively, the terminal device measures the K beams, and reports a measurement result to the access network device; the access network device configures an active beam set for the terminal device based on the measurement result; and the terminal device uses the active beam set as a reference evaluation beam set, and obtains the first signal quality based on signal quality of beams in the reference evaluation beam set.

Optionally, the terminal device may obtain a signal quality sum of the reference assessment beam set based on the signal quality of the beams in the reference assessment beam set; and then use the signal quality sum of the reference assessment beam set as the first signal quality; or average the signal quality sum of the reference assessment beam set to obtain average signal quality of the reference assessment beam set, and use the average signal quality of the reference assessment beam set as the first signal quality; or use a ratio of the signal quality sum of the reference assessment beam set to N2 as the first signal quality, where N2 is a value predefined by the terminal device or a value configured by the access network device.

Alternatively, the terminal device may select a beam whose signal quality is greater than a quality threshold from the reference assessment beam set as a to-be-calculated beam, and obtain a first quality sum based on signal quality of the to-be-calculated beam; and then use the first quality sum as the first signal quality; or average the first quality sum to obtain first average signal quality, and use the first average signal quality as the first signal quality; or use a ratio of the first quality sum to N2 as the first signal quality.

Step S403: The terminal device determines, based on the first signal quality, whether to trigger a measurement event.

For example, the terminal device compares the first signal quality with a fourth quality threshold, and triggers the measurement event if the first signal quality is greater than the fourth quality threshold. The fourth quality threshold may be configured by the access network device or predefined by the terminal device, and the measurement event may be a measurement event A3, or a measurement event A4, or the like.

Optionally, the terminal device further receives time-frequency resource configuration information that is of a beam of a neighboring cell and that is configured by the access network device, and time-frequency resource configuration information of each beam further carries information about a cell to which the beam belongs. The configuration information of each beam corresponds to resource configuration information of a CSI-RS. Therefore, the terminal device determines a CSI-RS included in the neighboring cell or each CSI-RS group, and then calculates signal quality of the neighboring cell based on the CSI-RS included in the neighboring cell or based on signal quality of the CSI-RS group. For a specific calculation method, refer to the foregoing method for calculating the signal quality of the cell.

Correspondingly, the terminal device may compare the first signal quality with the signal quality of the neighboring cell or the signal quality of the CSI-RS group, and trigger the measurement event if the first signal quality is less than the signal quality of the neighboring cell or the signal quality of the CSI-RS group.

Optionally, when the reference evaluation beam set belongs to a secondary serving cell of the terminal device, after the terminal device receives a deactivation command for the secondary serving cell, the terminal device suspends measurement of the reference evaluation beam set, and stops evaluation of a related measurement event. After receiving an activation command for the secondary serving cell again, the terminal device continues the measurement of the reference evaluation beam set, and starts the evaluation of the related measurement event. For example, when configuring a measurement event A6 (an event of comparing the CSI-RS of the neighboring cell with a CSI-RS of a current secondary serving cell), the terminal device needs to measure a reference evaluation beam set of the current secondary serving cell and the CSI-RS of the neighboring cell. After the secondary serving cell is deactivated, sending of the reference evaluation beam set of the secondary serving cell stops. If the terminal device continues the measurement and the event evaluation, a measurement event is triggered erroneously. Therefore, in this case, the reference evaluation beam set measurement and the event evaluation need to be stopped.

In the prior art, a terminal device determines, based on signal quality of a single beam, whether to trigger a measurement event. Because signal quality of a single beam cannot accurately reflect signal quality of a cell, triggering a measurement event based on signal quality of a single beam wastes measurement resources. In this embodiment, the terminal device determines, based on signal quality of a plurality of beams in the active beam set determined by the access network device, whether to trigger a measurement event, and signal quality of the active beam set can reflect the signal quality of the cell relatively well, thereby avoiding unnecessary measurement, and reducing waste of the measurement resources.

Figure 7:
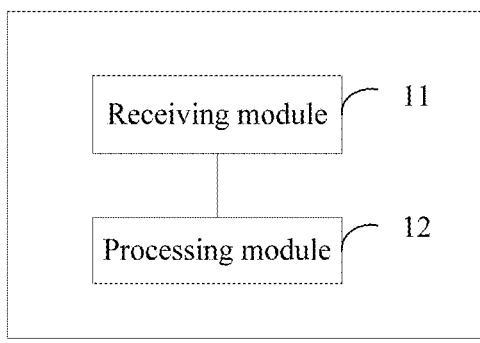
FIG. 7 is a schematic structural diagram of a terminal device according to Embodiment 5.

FIG. 7 is a schematic structural diagram of a terminal device according to Embodiment 5. As shown in FIG. 7, the terminal device provided in this embodiment includes:

a receiving module 11, configured to receive a plurality of beams, where the plurality of beams carry synchronization signal blocks, and the plurality of beams belong to one cell; and a processing module 12, configured to obtain signal quality of the plurality of beams based on the synchronization signal blocks, where the signal quality of the plurality of beams includes signal quality of a same beam at different moments.

The processing module is further configured to obtain signal quality of the cell based on the signal quality of the plurality of beams.

Optionally, at least one piece of signal quality of one beam in the signal quality of the plurality of beams is obtained by using a synchronization signal block of the beam.

Optionally, that the processing module 12 is configured to obtain signal quality of the cell based on the signal quality of the plurality of beams includes:

separately performing filtering processing on the signal quality of the plurality of beams; and obtaining the signal quality of the cell based on filtered signal quality of the plurality of beams.

Optionally, the receiving module 11 is further configured to receive only some beams of the cell when the signal quality of the cell exceeds a second quality threshold.

Optionally, the processing module 12 is further configured to obtain a synchronization signal burst set sending period of the cell.

That a processing module 12 is configured to receive the plurality of beams includes:

receiving, within at least two synchronization signal burst set sending periods, the plurality of beams sent by an access network device.

That a processing module 12 is configured to obtain signal quality of the plurality of beams based on the synchronization signal blocks includes: determining that beam signal quality detected on synchronization signal blocks at a same corresponding position in the at least two synchronization signal burst set sending periods belongs to a same beam; or determining, based on a beam timing index included in each received synchronization signal block, an identifier of a beam on which each synchronization signal block is sent, and determining that signal quality of beams having a same identifier belongs to a same beam.

Optionally, that the processing module 12 determines, based on a beam timing index included in each received synchronization signal block, an identifier of a beam on which each synchronization signal block is sent includes: performing a modulo operation on the beam timing index included in each synchronization signal block and the synchronization signal burst set sending period, to obtain the identifier of the beam on which each synchronization signal block is sent; or determining that the beam timing index included in each synchronization signal block is the identifier of the beam on which each synchronization signal block is sent.

Optionally, that the processing module 12 obtains the signal quality of the cell based on filtered signal quality of the plurality of beams includes: selecting B beams whose filtered signal quality is the best from the plurality of beams, where B is greater than or equal to 1 and is less than or equal to N, and N is a beam quantity threshold and is greater than or equal to 1; adding up the filtered signal quality of the B beams, to obtain a signal quality sum; and determining the signal quality of the cell based on the signal quality sum.

Optionally, that the processing module 12 selects B beams whose filtered signal quality is the best from the plurality of beams includes: selecting M beams whose signal quality is greater than a third quality threshold from the plurality of beams based on the filtered signal quality of the plurality of beams; and when M is greater than N and B is equal to N, selecting N beams from the M beams; or when M is less than N and B is equal to M, determining that the M beams are beams whose filtered signal quality is the best.

Optionally, that the processing module 12 determines the signal quality of the cell based on the signal quality sum includes:

determining the signal quality sum as the signal quality of the cell; or determining a ratio of the signal quality sum to N as the signal quality of the cell; or determining a ratio of the signal quality sum to B as the signal quality of the cell.

Optionally, that the receiving module 11 receives only some beams of the cell includes:

receiving only synchronization signal blocks that are sent on B beams whose filtered signal quality is the best in the cell, where B is greater than or equal to 1 and is less than or equal to N, and N is a beam quantity threshold and is greater than or equal to 1; or receiving only a synchronization signal burst in which the synchronization signal blocks sent on the B beams are located; or receiving only a synchronization signal block that is sent on a beam whose filtered signal quality is the best in the cell; or receiving only a synchronization signal burst in which a synchronization signal block sent on a beam whose filtered signal quality is the best is located.

Optionally, the terminal device further includes a sending module (which is not shown in the figure). The receiving module 11 is further configured to receive a plurality of beams of a neighboring cell of the cell.

The processing module 12 is further configured to:

obtain signal quality of the neighboring cell based on the plurality of beams of the neighboring cell; and determine an identifier of a to-be-reported beam from the plurality of beams of the neighboring cell, and/or determine an identifier of a to-be-reported beam from the plurality of beams of the cell.

The sending module is configured to send the signal quality of the neighboring cell, the signal quality of the cell, and the identifier of the to-be-reported beam of the cell and/or the identifier of the to-be-reported beam of the neighboring cell to an access network device.

Optionally, that the processing module 12 determines an identifier of a to-be-reported beam from the plurality of beams of the neighboring cell, and/or determines an identifier of a to-be-reported beam from the plurality of beams of the cell includes:

determining a beam whose filtered signal quality is greater than or equal to a preset third quality threshold as a to-be-reported beam based on the filtered signal quality of the beams of the cell, and/or determining a beam whose filtered signal quality is greater than or equal to the third quality threshold as a to-be-reported beam based on filtered signal quality of the beams of the neighboring cell; or determining N1 beams whose signal quality is the best from the plurality of beams of the cell as to-be-reported beams based on a beam reporting quantity N1 configured by the access network device, and/or determining N1 beams whose signal quality is the best from the plurality of beams of the neighboring cell as to-be-reported beams.

The terminal device provided in this embodiment can be used to perform the steps that are performed by the terminal device in Embodiment 1 to Embodiment 4. Specific implementations and technical effects are similar to those in Embodiment 1 to Embodiment 4, and details are not described herein again.

Figure 8:
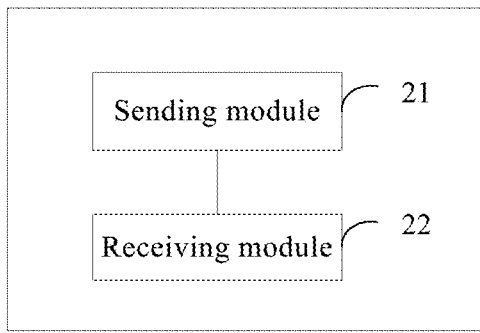
FIG. 8 is a schematic structural diagram of an access network device according to Embodiment 6.

FIG. 8 is a schematic structural diagram of an access network device according to Embodiment 6. As shown in FIG. 8, the access network device provided in this embodiment includes:

a sending module 21, configured to send synchronization signal blocks on a plurality of beams of a cell, where the sending module 21 is further configured to send a message to a terminal device, where the message indicates a quantity of to-be-reported beams or at least one quality threshold of a to-be-reported beam of the terminal device, and the at least one quality threshold is used for beam measurement; and a receiving module 22, configured to receive signal quality of the cell from the terminal device or an identifier that is of a to-be-reported beam of the cell and that is sent by the terminal device, where the signal quality of the cell is obtained by using the synchronization signal blocks.

Optionally, the receiving module 22 is further configured to receive signal quality of a neighboring cell of the cell that is sent by the terminal device or an identifier that is of a to-be-reported beam of the neighboring cell and that is sent by the terminal device.

The access network device provided in this embodiment can be used to perform the steps that are performed by the access network device in Embodiment 1 to Embodiment 4. Specific implementations and technical effects are similar to those in Embodiment 1 to Embodiment 4, and details are not described herein again.

Figure 9:
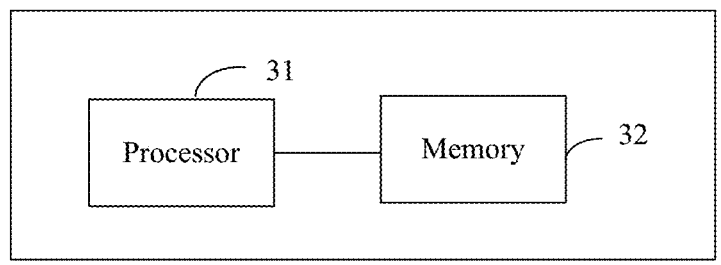
FIG. 9 is a schematic structural diagram of a terminal device according to Embodiment 7.

FIG. 9 is a schematic structural diagram of a terminal device according to Embodiment 7. As shown in FIG. 9, the terminal device includes a processor 31 and a memory 32, where the memory 32 is configured to store an instruction, and the processor 31 is configured to execute the instruction stored in the memory 32, so that the terminal device performs the steps that are performed by the terminal device in Embodiment 1 to Embodiment 4. Specific implementations and technical effects are similar to those in Embodiment 1 to Embodiment 4, and details are not described herein again.

Figure 10:
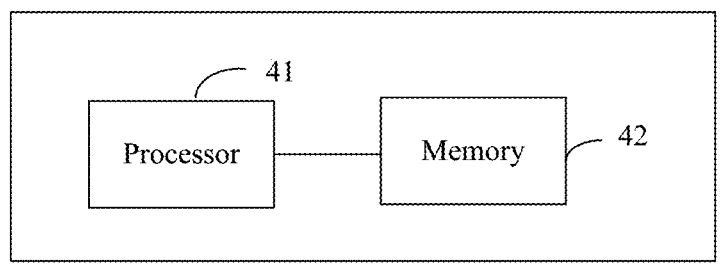
FIG. 10 is a schematic structural diagram of an access network device according to Embodiment 8.

FIG. 10 is a schematic structural diagram of an access network device according to Embodiment 8. As shown in FIG. 10, the access network device includes a processor 41 and a memory 42, where the memory 42 is configured to store an instruction, and the processor 41 is configured to execute the instruction stored in the memory 42, so that the access network device performs the steps that are performed by the access network device in Embodiment 1 to Embodiment 4. Specific implementations and technical effects are similar to those in Embodiment 1 to Embodiment 4, and details are not described herein again.

Figure 11:
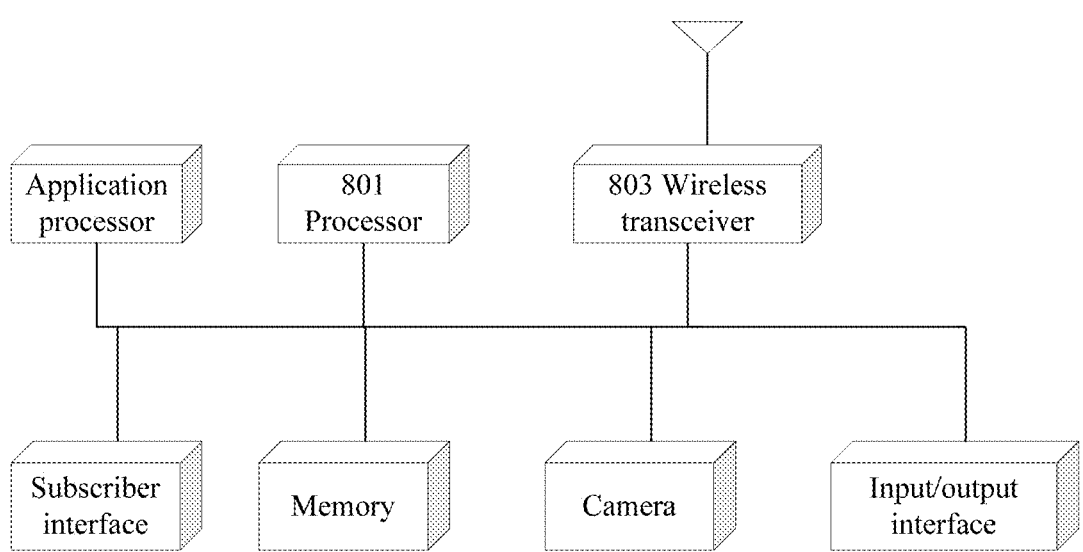
FIG. 11 is a schematic structural diagram of a communications device according to an embodiment of the present invention.

When a communications device in Embodiment 1 to Embodiment 5 is a terminal device, refer to a device shown in FIG. 11. The device includes a processor 801, an application processor, a memory, a subscriber interface, and some other elements (including a device such as a power supply that is not shown). In FIG. 11, the foregoing processing unit may be the processor 801, which implements a corresponding function. The foregoing sending unit and/or receiving unit may be a wireless transceiver 803 in the figure, which implements a corresponding function by using an antenna. It may be understood that elements shown in the figure are merely an example, and are not indispensable elements for implementing this embodiment.

Figure 12:
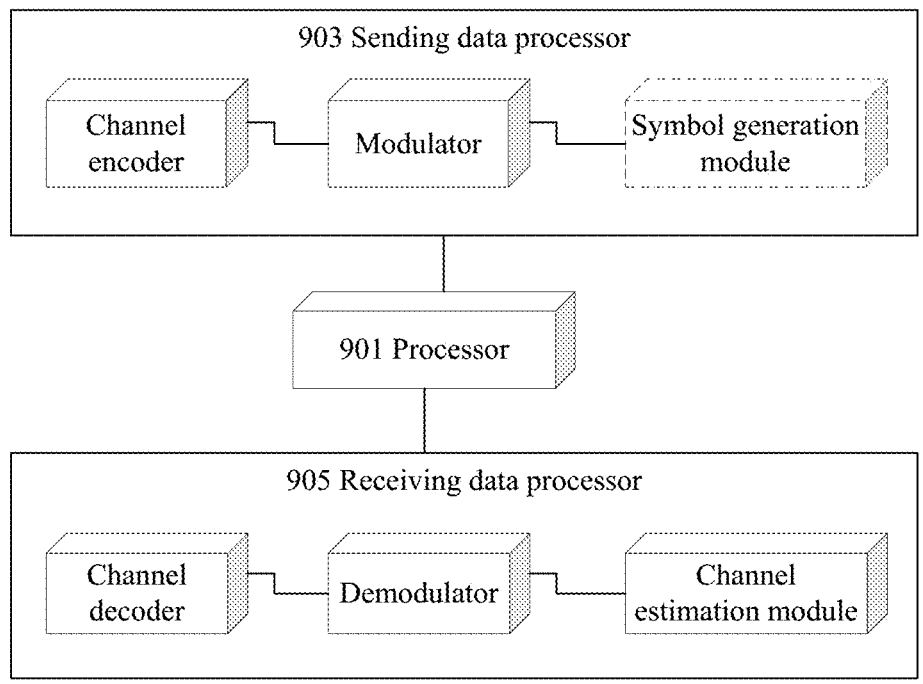
FIG. 12 is another schematic structural diagram of a communications device according to an embodiment of the present invention.

When a communications device in Embodiment 1 to Embodiment 5 is a terminal device, refer to a device shown in FIG. 12. In an example, the device can implement a function similar to a function of the processor in FIG. 11. In FIG. 12, the device includes a processor 901, a sending data processor 903, and a receiving data processor 905. In FIG. 12, the foregoing processing unit may be the processor 901, which implements a corresponding function. The foregoing sending unit may be the sending data processor 903 in FIG. 12, and the foregoing receiving unit may be the receiving data processor 905 in FIG. 12. Although a channel encoder and a channel decoder are shown in the figure, it may be understood that these modules are not construed as a limitation to this embodiment, and are merely an example.

Figure 13:
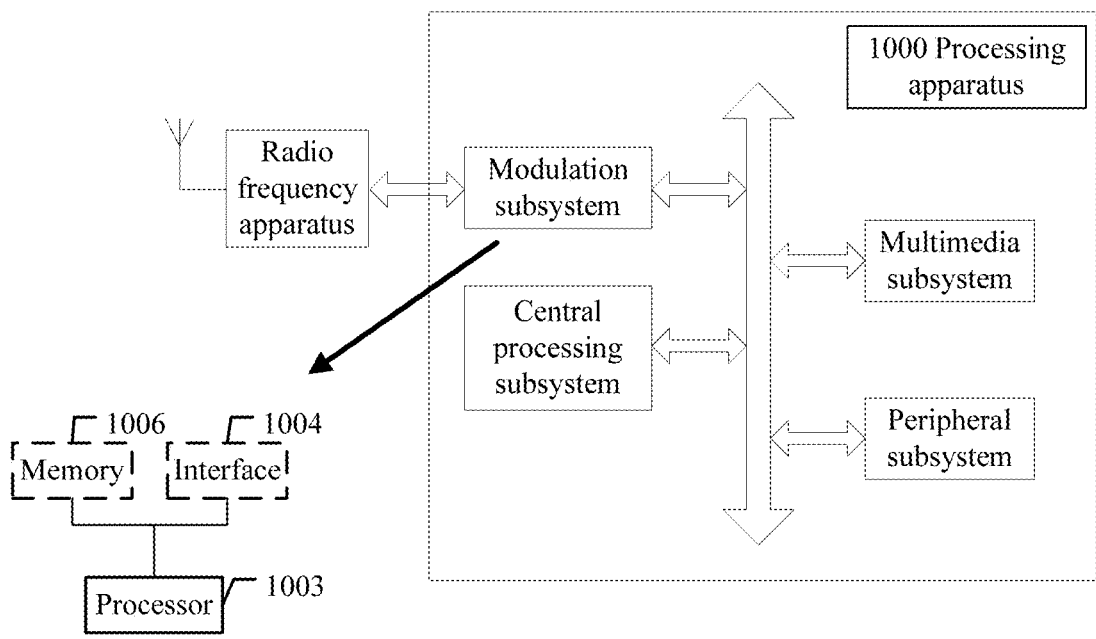
FIG. 13 is still another schematic structural diagram of a communications device according to an embodiment of the present invention.

FIG. 13 shows another implementation of Embodiment 1 to Embodiment 5 of this application. A processing apparatus 1000 includes a modulation subsystem, a central processing subsystem, a peripheral subsystem, and another module. A communications device in this embodiment may be used as the modulation subsystem in the processing apparatus 1000. Specifically, the modulation subsystem may include a processor 1003 and an interface 1004. The processor 1003 implements a function of the foregoing processing unit, and the interface 1004 implements a function of the foregoing sending unit and/or receiving unit. As another alternative, the modulation subsystem includes a memory 1006, a processor 1003, and a program that is stored on the memory and that can be run on the processor, where when executing the program, the processor implements the method in one of Embodiment 1 to Embodiment 5. It should be noted that, the memory 1006 may be non-volatile or volatile, and may be located inside the modulation subsystem or located in the processing apparatus 1000, provided that the memory 1006 can be connected to the processor 1003.

In another form of this embodiment, a computer readable storage medium is provided, storing an instruction, where the method according to one of Embodiment 1 to Embodiment 5 is performed when the instruction is executed.

It should be understood that the processor used by the access network device or the terminal device in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The bus described in this application may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of description, the bus in the accompanying drawings of this application is not limited to only one bus or only one type of bus.

In the several embodiments provided in this application, it should be understood that the disclosed apparatus and method may be implemented in other manners. The described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented electrically, mechanically, or in other forms.

The units described as separate parts may or may not be physically separate from each other, and parts displayed as units may or may not be physical units, and may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer readable storage medium. The foregoing software functional unit is stored in a storage medium and includes one or more instructions for instructing a computer device (which may be a personal computer, a server, or a network device) or a processor (English: processor) to perform a part of the steps of the methods described in the embodiments of this application. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

What is claimed is:

1. A measurement method, comprising:
   obtaining, by a terminal device, time-frequency resource configuration information of K beams of a cell, K being greater than or equal to 1;
   obtaining, by the terminal device, a first signal quality based on indication information by using a signal quality of M beams in the K beams, M≤K, the indication information is carried in a configuration of a measurement event and the indication information indicating whether a channel state information-reference signal (CSI-RS) or a synchronization signal block is used for triggering the measurement event; and
   determining, by the terminal device, based on the first signal quality, whether to trigger the measurement event.

2. The method according to claim 1, further comprising:
   receiving, by the terminal device, the indication information from an access network device.

3. The method according to claim 1, wherein
   the indication information indicates that the terminal device uses the CSI-RS to perform event evaluation.

4. The method according to claim 1, wherein the obtaining the first signal quality by using the signal quality of the M beams in the K beams comprises:
   separately detecting, by the terminal device based on time-frequency resource configuration information of each of the M beams, reference signals sent on the M beams, to obtain the signal quality of the M beams; and
   obtaining the first signal quality based on the signal quality of the M beams,
   the reference signal being a CSI-RS, the configuration information of each of the M beams corresponding to resource configuration information of the CSI-RS, and the resource configuration information of each CSI-RS comprising information about a corresponding cell.

5. The method according to claim 1, wherein determining, based on the first signal quality, whether to trigger the measurement event, comprises:
   comparing, by the terminal device, based on the first signal quality and a quality threshold, the quality threshold being configured by an access network device; and
   determining, by the terminal device, whether to trigger the measurement event, according to a result of the comparing.

6. A measurement configuration method, comprising:
   sending, by a network device, time-frequency resource configuration information of K beams of a cell to a terminal device, K being greater than or equal to 1; and
   sending, by the network device, a configuration of a measurement event to the terminal device, the configuration of the measurement event carrying indication information which indicates whether the terminal device uses a channel state information-reference signal (CSI-RS) or a synchronization signal block for triggering the measurement event.

7. The method according to claim 6, comprising:
sending, by the network device, a reference signal, the reference signal being a CSI-RS, the configuration information of each of the K beams corresponding to resource configuration information of the CSI-RS, and the resource configuration information of each CSI-RS comprising information about a corresponding cell.

8. An apparatus, comprising:
a processor; and
a non-transitory memory, wherein the memory stores execution instructions; and
wherein when the processor executes the execution instructions the apparatus is enabled to perform the following operations:
obtaining time-frequency resource configuration information of K beams of a cell, wherein K is greater than or equal to 1;
obtaining a first signal quality based on indication information by using a signal quality of M beams in the K beams, wherein M≤K, the indication information is carried in a configuration of a measurement event from an access network device and the indication information indicates whether a channel state information-reference signal (CSI-RS) or a synchronization signal block is used for triggering the measurement event; and
determining, based on the first signal quality, whether to trigger the measurement event.

9. The apparatus according to claim 8, wherein when the processor executes the execution instructions the apparatus is enabled to perform the further operation:
receiving the indication information from the access network device.

10. The apparatus according to claim 8, wherein
the indication information indicates that a terminal device uses the CSI-RS to perform event evaluation.

11. The apparatus according to claim 8, wherein the operation of obtaining the first signal quality by using the signal quality of the M beams in the K beams comprises:
separately detecting, based on time-frequency resource configuration information of each of the M beams, reference signals sent on the M beams, to obtain the signal quality of the M beams; and obtaining the first signal quality based on the signal quality of the M beams, wherein
the reference signal is a CSI-RS, the configuration information of each of the M beams corresponds to resource configuration information of the CSI-RS, and the resource configuration information of each CSI-RS comprises information about a corresponding cell.

12. The apparatus according to claim 8, wherein the operation of determining, based on the first signal quality, whether to trigger the measurement event, comprises:
comparing the first signal quality and a quality threshold, wherein the quality threshold is configured by the access network device; and
determining whether to trigger the measurement event according to a result of the comparing.

13. A apparatus, comprising:
a processor; and
a non-transitory memory, wherein the memory stores execution instructions; and wherein when the processor executes the execution instructions the apparatus is enabled to perform the following operations:
sending time-frequency resource configuration information of K beams of a cell to a terminal device, wherein K is greater than or equal to 1; and
sending a configuration of a measurement event to the terminal device, wherein the configuration of the measurement event carrying indication information, which indicates whether the terminal device uses a channel state information-reference signal CSI-RS or a synchronization signal block for triggering the measurement event.

14. The apparatus according to claim 13, wherein when the processor executes the execution instructions the apparatus is enabled to perform the further operation:
sending a reference signal, wherein the reference signal is a CSI-RS, the configuration information of each of the K beams corresponds to resource configuration information of the CSI-RS, and the resource configuration information of each CSI-RS comprises information about a corresponding cell.

* * * * *